(12) United States Patent
Tai et al.

(10) Patent No.: US 7,532,329 B2
(45) Date of Patent: May 12, 2009

(54) FIBER OPTIC INTERFEROMETRIC POSITION SENSOR AND MEASUREMENT METHOD THEREOF

(75) Inventors: Hung-Ming Tai, Hsinchu (TW);
Jung-Tsung Chou, Jhongli (TW);
Kai-Yu Cheng, Taipei (TW);
Huang-Chi Huang, Hsinchu (TW);
Chiung-Huei Huang, Kaohsiung (TW);
Ching-Ming Yeh, Hsinchu (TW)

(73) Assignee: Industrial Technology Research Institute, Chutung (TW)

( * ) Notice: Subject to any disclaimer, the term of this patent is extended or adjusted under 35 U.S.C. 154(b) by 0 days.

(21) Appl. No.: 11/822,902

(22) Filed: Jul. 11, 2007

(65) Prior Publication Data

US 2008/0013095 A1    Jan. 17, 2008

Related U.S. Application Data

(62) Division of application No. 11/157,983, filed on Jun. 22, 2005, now Pat. No. 7,349,099.

(30) Foreign Application Priority Data

Nov. 23, 2004    (TW) .............................. 93135967 A

(51) Int. Cl.
*G01B 9/02* (2006.01)
(52) U.S. Cl. ..................................... 356/482
(58) Field of Classification Search ................. 356/478, 356/482
See application file for complete search history.

(56) References Cited

U.S. PATENT DOCUMENTS

| 4,589,286 A | * | 5/1986 | Berthold, III | ................. 73/715 |
| 5,052,228 A | * | 10/1991 | Haritonidis | ................. 356/482 |
| 5,301,001 A | * | 4/1994 | Murphy et al. | ............... 356/482 |

FOREIGN PATENT DOCUMENTS

| JP |   | 62242805 A | * | 10/1987 |
| JP |   | 09257415 A | * | 10/1997 |

* cited by examiner

*Primary Examiner*—Samuel A Turner
(74) *Attorney, Agent, or Firm*—Bacon & Thomas, PLLC

(57) ABSTRACT

A fiber optic interferometric position sensor and measurement method thereof suitable for determining the moving direction of a measurement object in an environment of high electric or magnetic field strengths are disclosed. The fiber optic interferometric position sensor comprises at least one light source, a plurality of fiber optic couplers, a plurality of sensing fibers and a plurality of photodetectors. The fiber optic couplers are connected to the at least one light source, the photodetectors, and the sensing fibers, respectively. The measurement method comprises: providing a fiber optic interferometric position sensor and a measurement object, obtaining two initial signals having a 90-degree phase difference therebetween, obtaining two measured signals, correcting the measured signals by a bias correction method, obtaining the phase value from the two measured signals by an electronic interpolation technique, and obtaining the position of the measurement object after computation by using the phase value.

9 Claims, 14 Drawing Sheets

FIBER OPTIC INTERFEROMETRIC POSITION SENSOR AND MEASUREMENT METHOD THEREOF

This application is a Division of nonprovisional application Ser. No. 11/157,983, filed Jun. 22, 2005 now U.S. Pat. No. 7,349,099.

BACKGROUND OF THE INVENTION

1. Field of the Invention

The present invention relates to a fiber optic interferometric position sensor and measurement method thereof, and more particularly, to a fiber optic interferometric position sensor and measurement method thereof suitable for determining the moving direction of a measurement object in an environment of high electric or magnetic field strengths.

2. Description of Related Art

At present, the industry primarily adopts a capacitor sensor to serve as a sub-nanometer scale position sensor. However, the capacitor sensor has some drawbacks, as immediately described below, which limit its application scope. At first, if a high electric or magnetic field strength is applied to the neighborhood of the probe of the capacitor sensor during measurement, the reading obtained by the capacitor sensor will be affected. As a result, an error occurs in this measurement. Next, in order to apply the principle of the capacitor to detect the displacement and the position of a measurement object, it is necessary to have an electrode plate pivotally locked on the measurement object prior to the measurement. Due to the huge size of the electrode plate, the displacement of the measurement object is disadvantageously affected, and also, the installation of the electrode plate over the surface of the measurement object becomes complex. As such, the capacitor sensor is generally not suitable for being applied to a sub-nanometer scale position sensing environment where the measurement object is usually smaller and less weight, where the space for installation of the electrode plate is limited or where high noise signals caused by electromagnetic radiation exist.

A fiber optic interferometer configured as shown in FIG. 1a can also serve as a sensor for sub-nanometer scale position sensing measurement. After a laser beam is transmitted from a light source 11 of a fiber optic interferometer 1 to a fiber optic coupler 12, the laser beam is directed into a sensing fiber 13. When the laser beam is incident on a fiber termination 14, a part of the laser beam is reflected back into the sensing fiber 13 and another part of the laser beam passes through the fiber termination 14 and reaches the surface 16 of a measurement object 15. Then, the laser beam incident on the surface 16 of the measurement object 15 is reflected from the surface 16 and travels back to the fiber termination 14, in which the reflected laser beam partially passes through the fiber termination 14 so as to be transmitted into the sensing fiber 13. This partially passed laser beam and the laser beam previously reflected back into the sensing fiber 13 directly from the fiber termination 14 generate an interference effect, resulting in an interference beam. The interference beam is transmitted into a photodetector 17 via the fiber optic coupler 12, and a change in the interference pattern is detected and recorded by the photodetector 17. Thus, the fiber optic interferometer requires only a small reflecting surface on the measurement object to proceed with the measurement, and has a more broad application scope than the aforesaid capacitor sensor. Because there is no electronic element near the end of the measurement object, the value obtained as a result of the measurement will not be sensitive to the electromagnetic radiation of the measurement object.

The operating principle of the aforesaid fiber optic interferometer will be described below.

Turning to FIG. 1b, if the initial intensity of the laser beam transmitted into the sensing fiber 13 from the fiber optic coupler 12 is $I_0$ and the reflective index of the fiber termination 14 is $R_1$, the intensity $I_1$ of the laser beam which is reflected from the fiber termination 14 and travels back to the sensing fiber 13 will be $R_1 I_0$ while the intensity of the laser beam which passes through the fiber termination 14 will be $(1-R_1)I_0$. In addition, if the reflective index of the surface 16 of the measurement object 15 is $R_2$, the intensity $I_2$ of the laser beam which is reflected from surface 16 and again transmitted into the sensing fiber 13 will be $(1-R_1)^2 R_2 I_0$.

Finally, if γ is the coherence factor of the laser beam, the interference signal detected by the photodetector 17 can be expressed as:

$$I = R_1 I_0 + (1-R_1)^2 I_0 R_2 + 2\gamma(1-R_1)I_0\sqrt{R_1 R_2}\cos\phi \quad \text{(Equation 1)}$$

where ϕ is the phase difference between the two light beams $I_1$ and $I_2$, having the following relationship:

$$\phi = 2d \cdot \frac{2\pi}{\lambda} \cdot n_g$$

where λ is the wavelength of the laser beam, and $n_g$ is the refractive index of the medium outside the fiber.

In addition, the relationship among γ, the coherence length $L_c$ of the laser beam and a gap d is given by:

$$\gamma = \text{sinc}(2d/L_c) = \frac{\sin(2d\pi/L_c)}{2d\pi/L_c} \quad \text{(Equation 2)}$$

FIG. 2 is a pattern of an interference signal as described in Equation (1). When the medium outside the sensing fiber 13 is air (namely, the measurement is made in the atmosphere), the period of the interference signal as shown in FIG. 2 is about one-half wavelength of the laser beam.

In this light, because the fiber optic interferometer adopts two measuring beams having different optical path lengths to cause an interference phenomenon for measuring the displacement of the measurement object, the value obtained as a result of such a measurement will not be so sensitive to the electromagnetic radiation, as compared with the value measured by the capacitor sensor, when there is a high electric or magnetic field strength at the end of the measurement object.

Though the aforesaid fiber optic interferometer can measure the amount of a displacement of the measurement object, it cannot detect the moving direction of the measurement object for only one sensing fiber is used. In addition, the resolution of the fiber optic interferometer having a single sensing fiber is one-half wavelength of the laser beam at the most. In other words, a displacement less than one-half wavelength of the laser beam (about hundreds nanometers) cannot be measured by the fiber optic interferometer having a single sensing fiber. Hence, the aforesaid fiber optic interferometer equipped with a single sensing fiber has an extremely narrow application scope, and cannot serve as a position sensor in an application to a device having a tiny displacement, such as a piezoelectric displacement unit, a nanometer controlling unit or a micro-gage.

It is therefore a dire need for the industry to provide a fiber optic interferometric position sensor having high resolution where a reading therefrom will not be sensitive to a high electric or magnetic field strength of the surrounding environment so as to rapidly and precisely measure the displacement and the position of a measurement object.

SUMMARY OF THE INVENTION

A fiber optic interferometric position sensor according to the present invention is suited to a measurement object, comprising at least one light source providing an optical signal, a plurality of fiber optic couplers, a plurality of sensing fibers, and a plurality of photodetectors. The fiber optic couplers are connected to the at least one light source and the photodetectors, respectively. Each of the sensing fibers has a termination adjacent to the measurement object, connecting to each of fiber optic couplers. The optical signal is separated into a plurality of optical sub-signals so as to be respectively transmitted into the sensing fibers via the fiber optic couplers, where part of the optical sub-signals pass through the terminations of the sensing fibers and are incident on the surface of the measurement object respectively, being reflected back into the sensing fibers from the surface to form a plurality of measurement signals. Another part of the optical sub-signals is reflected back into the sensing fibers from the terminations of the sensing fibers, respectively, to form a plurality of reference optical signals. The reference optical signals and the measurement signals interfere, resulting in a plurality of interference signals. The interference signals travel to the photodetectors via the fiber optic couplers, respectively, and then, are detected and recorded by means of the photodetectors, respectively.

A method for measuring the position of a measurement object according to the present invention is associated with a fiber optic interferometric position sensor to measure the position of the measurement object, comprising: providing a fiber optic interferometric position sensor and a measurement object, the fiber optic interferometric position sensor being constituted by two fiber optic interferometers; obtaining a first initial signal and a second initial signal from the position of the measurement object measured by means of the fiber optic interferometric position sensor; adjusting the phase difference between the first initial signal and the second initial signal so as to alter the first initial signal and the second initial signal to form a third initial signal and a fourth initial signal which have a 90-degree phase difference; moving the measurement object to change the position of the measurement object so that the two fiber optic interferometers of the fiber optic interferometric position sensor output a first measurement signal and a second measurement signal respectively, corresponding to the position of the measurement object; computing the values of biases of the first measurement signal and the second measurement signal, respectively, both of which being corrected by a bias correction method to obtain a third measurement signal and a fourth measurement signal; obtaining the phase value corresponding to the position of the measurement object from the third measurement signal and the fourth measurement signal after calculation by an interpolation technique; and obtaining the position of the measurement object after computation by using the phase value.

Accordingly, the fiber optic interferometric position sensor of the present invention provides a fiber optic interferometric position sensor having a resolution of less than one-half wavelength of the light source to simply determine the moving direction of the measurement object. Because the size of the fiber optic interferometric position sensor of the present invention is smaller than that of the conventional fiber optic interferometers and the fiber optic interferometric position sensor of the present invention is applicable to an environment having high electric or magnetic field strengths, the fiber optic interferometric position sensor of the present invention has a broader application scope than the prior capacitor sensors and can serve as a position sensor of a device having a tiny displacement and a high resolution, such as a piezoelectric displacement unit, a nanometer controlling unit or a micro-gage.

In addition, the method for measuring the position of a measurement object according to the present invention provides a method for overcoming the drawbacks of the conventional fiber optic interferometers where not only the intensity of an interference signal is gradually decreased but also the waveform of the interference signal is gradually deformed as a gap is increased. The method for measuring the position of a measurement object according to the present invention incorporates a phase adjustment method, a bias correction method and an interpolation technique so that the fiber optic interferometric position sensor of the present invention characterized by a resolution of less than one-half wavelength of the light source and longer measurement distance is capable of rapidly measuring the displacement and the position of the measurement object. Hence, by adopting the method for measuring the position of a measurement object according to the present invention, the fiber optic interferometric position sensor of the present invention has a broader application scope than the prior capacitor sensors and can serve as a position sensor of a device having a tiny displacement and a high resolution, such as a piezoelectric displacement unit, a nanometer controlling unit or a micro-gage.

The number of the fiber optic interferometric position sensor of the present invention to form a multi-axis measuring apparatus for measuring the movements of the measurement object in multi-axial directions is not limited. The resulting multi-axis measuring apparatus can be used to measure any modes of movement of a measurement object. Preferably, the measurement is made in a three-degree-of-freedom circumstance (the X, Y and Z axes) or around an axis in case of rotation. The light source of the fiber optic interferometric position sensor according to the present invention is not specifically defined in number, but preferably is a single light source. The fiber optic coupler of the fiber optic interferometric position sensor according to the present invention is not specifically defined, but preferably is a sintered fiber optic coupler. The holding device (probing unit) of the fiber optic interferometric position sensor according to the present invention can be any fiber optic array connector capable of juxtaposing the fibers without limiting the unit, configuration or type thereof, and preferably is an MT fiber optic array connector, an SMA fiber optic array connector, an ST fiber optic array connector, an FC fiber optic array connector, an LC fiber optic array connector, an SC fiber optic array connector, an FC/APC fiber optic array connector or a V-shaped groove. The photodetector of the fiber optic interferometric position sensor according to the present invention is not specifically defined, but preferably is a charged-couple device (CCD) detector or a photodiode detector.

Other objects, advantages, and novel features of the invention will become more apparent from the following detailed description when taken in conjunction with the accompanying drawings.

BRIEF DESCRIPTION OF THE DRAWINGS

FIG. 1b is an enlarged diagram schematically illustrating a sensing section of a sensing fiber and a measurement object as shown in FIG. 1a.

FIG. 3b is an enlarged diagram schematically illustrating a first sensing fiber and a second sending fiber disposed over the surface of a measurement object as shown in FIG. 3a.

DETAILED DESCRIPTION OF THE PREFERRED EMBODIMENT

Figure 1A:
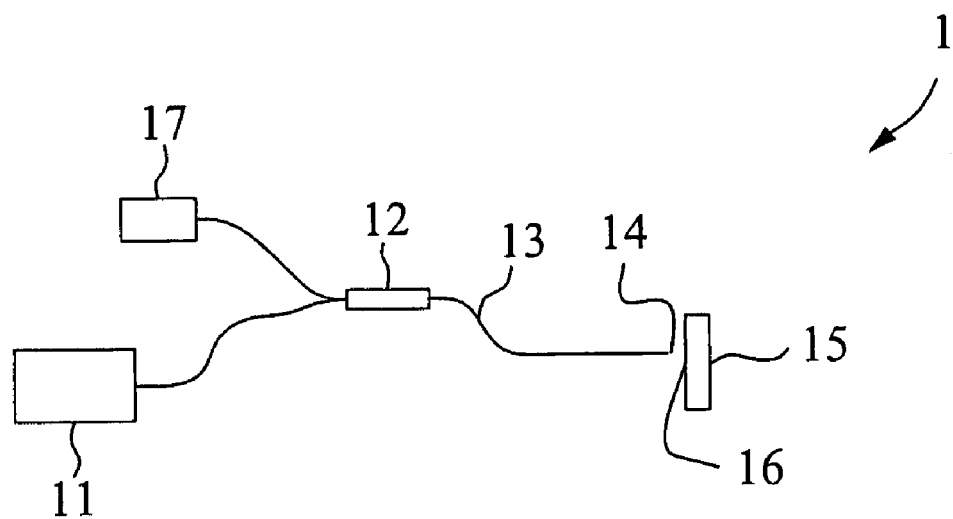
FIG. 1a is a schematic diagram of a conventional fiber optic interferometer.
Figure 1B:
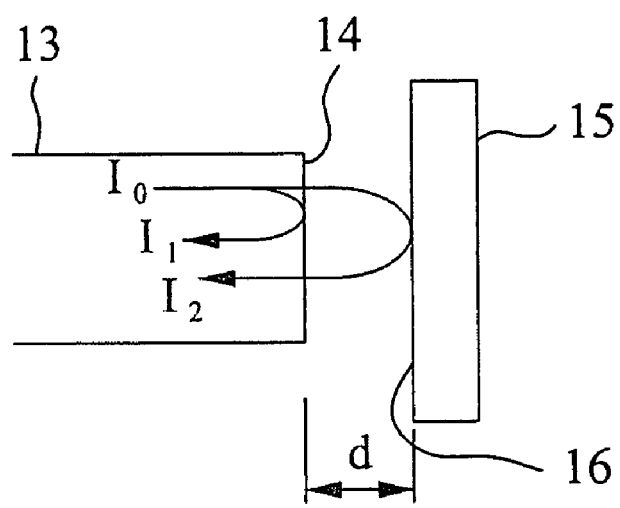
Figure 2:
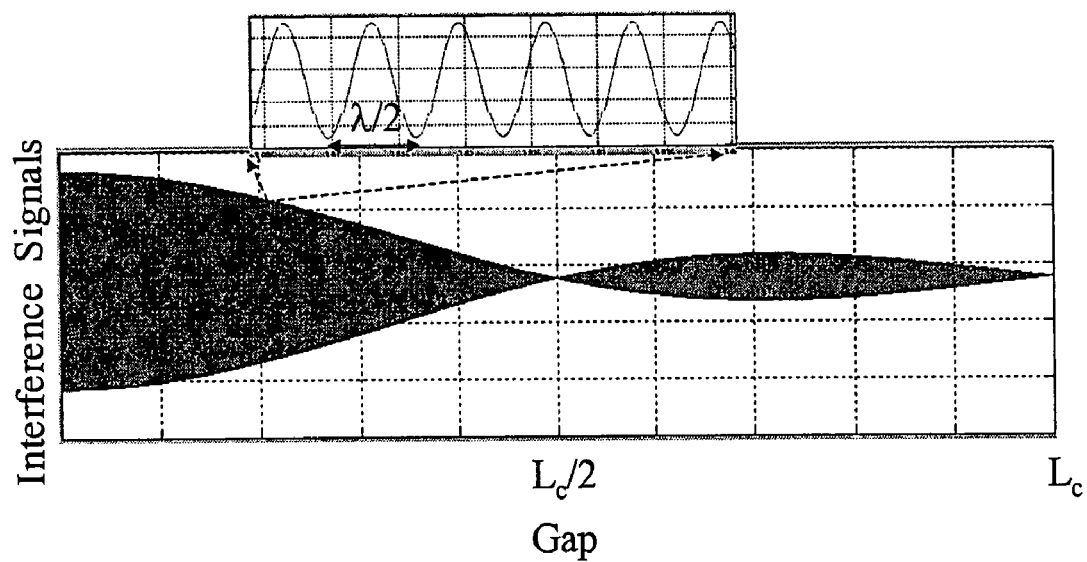
FIG. 2 shows a pattern of an interference signal obtained by a conventional fiber optic interferometer.
Figure 3A:
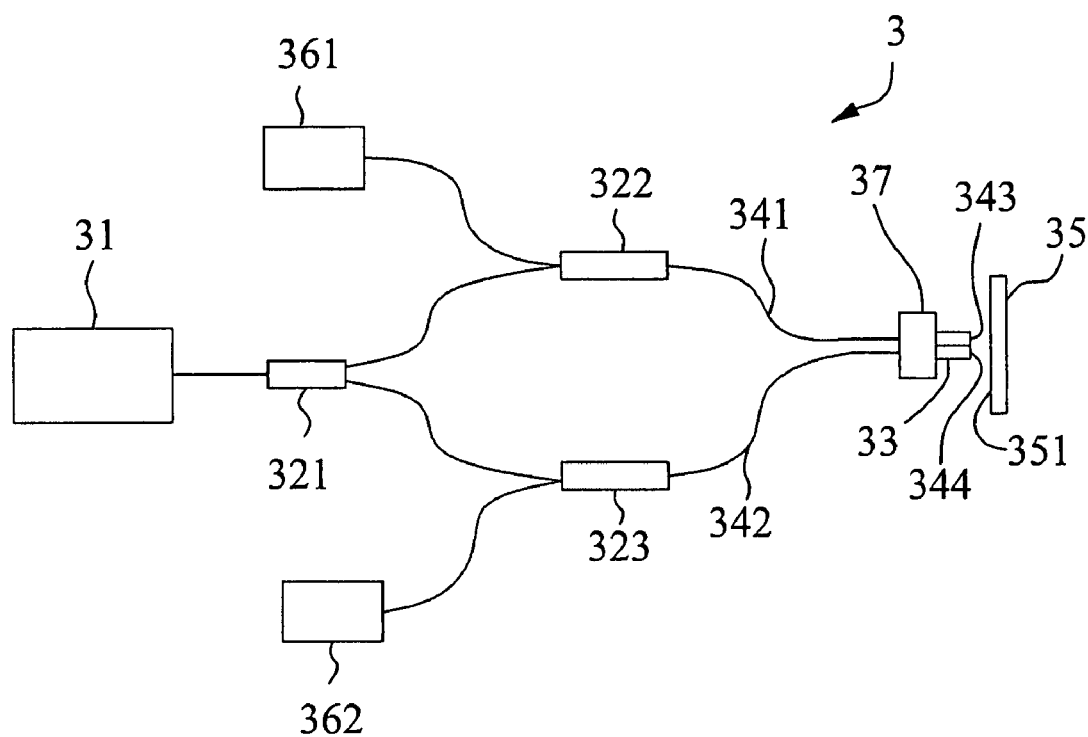
FIG. 3a is schematic diagram of a fiber optic interferometric position sensor according to the present invention.
Figure 3B:
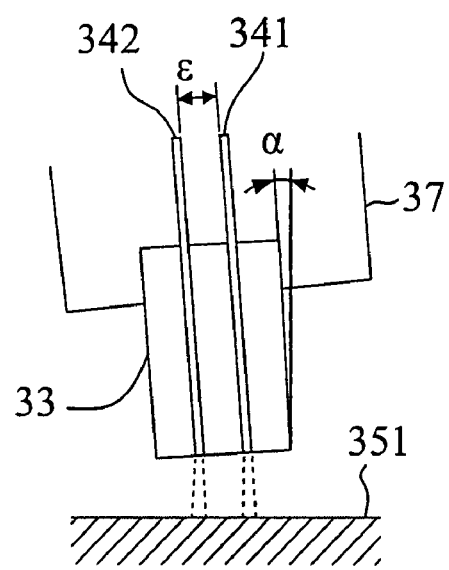

As shown in FIG. 3a, a fiber optic interferometric position sensor 3 of the present invention comprises a light source 31, a light-source fiber optic coupler 321, a first fiber optic coupler 322, a second fiber optic coupler 323, a first sensing fiber 341 and a second sensing fiber 342 both of which are fixed by means of an MT fiber optic array connector 33, a first photodetector 361 and a second photodetector 362. FIG. 3b is an enlarged diagram schematically illustrating the first sensing fiber 341 and the second sensing fiber 342 mounted on the surface 351 of a measurement object as shown in FIG. 3a, in which the provided MT fiber optic array connector 33 tilts a small angle α with respect to the normal line of the surface 351 of the measurement object by means of a micro-adjuster 37, the optical path length difference between the first sensing fiber 341 and the second sensing fiber 342 having a space ϵ from the first sensing fiber 341 that can be expressed as $2^{\epsilon\alpha}$.

The operating principle of the fiber optic interferometric position sensor 3 according to the present invention will be described below.

At the beginning, the light source 31 provides a laser beam transmitted to the light-source fiber optic coupler 321, the laser beam then being separated into two laser beams to be transmitted into the first fiber optic coupler 322 and the second fiber optic coupler 323, respectively. Then, the first fiber optic coupler 322 (the second fiber optic coupler 323) directs the laser beam to be transmitted into the first sensing fiber 341 (the second sensing fiber 342), in which a part of the laser beam is reflected back into the first sensing fiber 341 (the second sensing fiber 342) from a fiber termination 343 (344) of the first sensing fiber 321 (the second sensing fiber 342) and another part of the laser beam passes through the first termination 343 (344) and is incident on the surface 351 of the measurement object 35 to be reflected from the surface 351. Then, this reflected laser beam passes through the fiber termination 343 (344) and is again transmitted into the first sensing fiber 341 (the second sensing fiber 342), causing an interference phenomenon with the laser beam previously reflected directly from the fiber termination 343 (344). As a result, an interference beam $I_A$ ($I_B$) is generated. The interference beam $I_A$ ($I_B$) is then transmitted to the first photodetector 361 (the second photodetector 362) via the first fiber optic coupler 322 (the second fiber optic coupler 323), and a change thereof is detected and recorded by the first photodetector 361 (the second photodetector 362).

Consequently, interference signals $I_A$ and $I_B$ detected by the first photodetector 361 and the second photodetector 362, respectively, can be expressed as:

$$I_A = R_1 I_0 + (1-R_1)^2 I_0 R_2 + 2\gamma_A (1-R_1) I_0 \sqrt{R_1 R_2} \cos(4\pi d_A/\lambda) \quad \text{(Equation 3)}$$

$$I_B = R_1 I_0 + (1-R_1)^2 I_0 R_2 + 2\gamma_B (1-R_1) I_0 \sqrt{R_1 R_2} \cos(4\pi d_B/\lambda) \quad \text{(Equation 4)}$$

where $d_A$ represents the distance (gap) between a fiber terminal end (e.g., the fiber termination 343) and the reflection surface (the surface 351 of the measurement object), $d_B$ represents the distance (gap) between the other fiber end (the fiber termination 344) and the reflection surface (the surface 351 of the measurement object), and $\gamma_A$ and $\gamma_B$ represent the results obtained from Equation (2) with substitutions of the value of $d_A$ and $d_B$, respectively.

As shown in FIG. 3b, prior to the measurement by means of the fiber optic interferometric position sensor of the present invention, the MT fiber optic array connector 33 has been titled a predetermined angle α by means of the micro-adjuster 37 so that the gap $d_A$ and the gap $d_B$ have the following relationship:

$$d_B = d_A + m\lambda/2 + \lambda/8, m \in Z$$

In addition, due to $L_c/\lambda >> |m|$, it is inferable from Equation (2) to have $\gamma_A \approx \gamma_B$ and the following relationship:

$$\cos(4\pi d_A/\lambda) = \sin(4\pi d_B/\lambda)$$

Then, by defining:

$I_{DC} = R_1 I_0 + (1-R_1)^2 I_0 R_2$, $I_P = I_A - I_{DC}$, $I_Q = I_B - I_{DC}$, $\gamma_B =$ and $S = 2\gamma(1-R_1) I_0 \sqrt{R_1 R_2}$, it is inferable from Equations (3) and (4) to have the following equations:

$$I_P = S \sin(4\pi d_B/\lambda) \quad \text{(Equation 5)}$$

$$I_Q = S \cos(4\pi d_B/\lambda) \quad \text{(Equation 6)}$$

$$\frac{I_P}{I_Q} = \tan(4\pi d_B/\lambda) \quad \text{(Equation 7)}$$

$$\frac{4\pi d_B}{\lambda} = \tan^{-1}\left(\frac{I_P}{I_Q}\right) + 2m\pi \quad \text{(where } m \text{ is an integral)} \quad \text{(Equation 8)}$$

where, there is a 90-degree phase difference between $I_P$ and $I_Q$.

After the above alterations, the interference-related portions of the interference signals $I_A$ and $I_B$ can be eliminated, easily overcoming the problem of having the intensity of the interference signals $I_A$ and $I_B$ decreased as the gaps $d_A$ and $d_B$ are increased.

Figure 4:
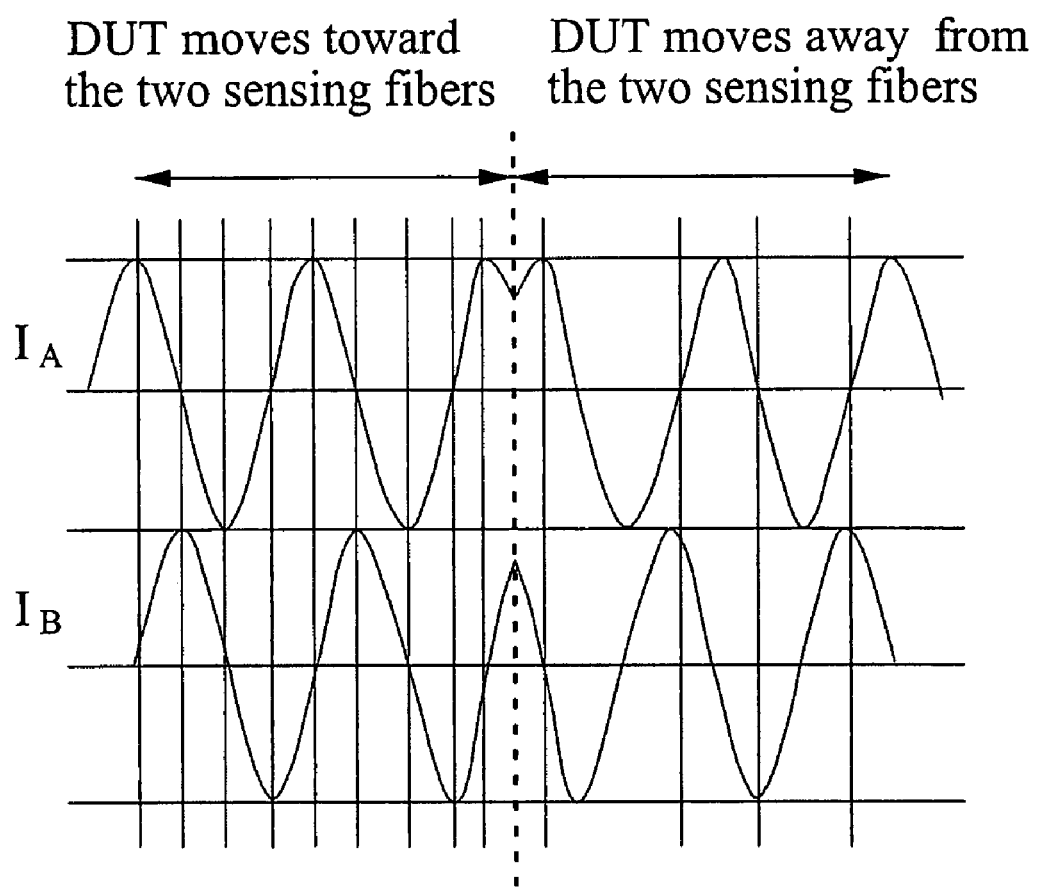
FIG. 4 shows schematic patterns of interference signals obtained by a fiber optic interferometric position sensor according to the present invention when a measurement object moves in different directions.

As shown in FIG. 4, when the measurement object moves in different directions with respect to the fiber optic interferometric position sensor of the present invention, the relative relationship between the two interference signals $I_A$ and $I_B$ obtained by means of the fiber optic interferometric position sensor of the present invention is varied. For example, when the measurement object moves and is close to the two sensing fibers of the fiber optic interferometric position sensor of the present invention, the interference signal $I_A$ gets ahead the interference signal $I_B$; or conversely, when the measurement object moves and is away from the two sensing fibers of the fiber optic interferometric position sensor of the present invention, the interference signal $I_A$ gets behind the interference signal $I_B$. Hence, when the fiber optic interferometric position sensor of the present invention is adopted to measure the displacement of the measurement object, both the direction and the displacement of the measurement object can be easily determined by referring to the relative relationship between the two interference signals $I_A$ and $I_B$ in association with a counter for counting the number of the waves of the interference signals.

In addition, when the laser beam leaves the terminal end of the sensing fiber, the beam profile thereof is slightly expanded. Such a phenomenon does not meet with the assumptions of the above-stated equations. Thus, Equations (3) and (4) need to be modified to become:

$$I_A = R_1 I_0 + (1-R_1)^2 I_0 R_2 T_A + 2\gamma_A(1-R_1)I_0\sqrt{R_1 R_2 T_A}\cos(4\pi d_A/\lambda) \quad \text{(Equation 9)}$$

$$I_B = R_1 I_0 + (1-R_1)^2 I_0 R_2 T_B + 2\gamma_B(1-R_1)I_0\sqrt{R_1 R_2 T_B}\cos(4\pi d_B/\lambda) \quad \text{(Equation 10)}$$

where $T_A$ and $T_B$ are the transmittance factors of the laser beam propagating in the medium outside the fiber, and also the two transmittance factors, gaps $d_A$ and $d_B$, wavelength $\lambda$ of the laser beam and the refractive index $n_g$ of the medium outside the fiber have the following relationship:

$$T_i = \frac{1}{\left(\frac{2d_i\lambda}{2\pi n_g w^2}\right)^2 + 1} \quad \text{(Equation 11)}$$

where i is equal to A or B, and w is the mode field diameter having to do with the type of the fiber. In addition, either $T_A$ or $T_B$ is a non-periodically slow-varying item, as compared with the cosine item. Hence, T is used to represent $T_A$ and $T_B$ for their very close value within an operation range.

Figure 5:
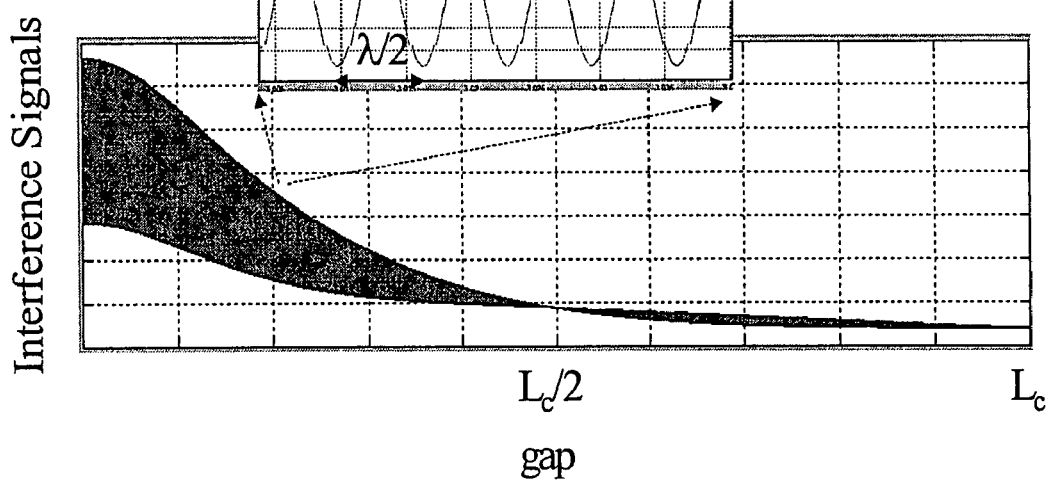
FIG. 5 shows schematic patterns of interference signals obtained by a fiber optic interferometric position sensor as varied with a gap d.

As apparent from the above, neither the second item "$(1-R_1)^2 I_0 R_2 T_i$" on the right hand side of the equal mark as described in Equations (9) and (10) is a constant, gradually decreasing as the gap $d_i$ is increased. Hence, in a real measurement, patterns of the two interference signals $I_A$ and $I_B$ obtained by means of the fiber optic interferometer will gradually decrease as the gaps $d_A$ and $d_B$ are increased, as shown in FIG. 5. In addition, when the measurement object moves to a predetermined distance (that is, the gap d reaches a predetermined value), the two interference signals $I_A$ and $I_B$ will greatly deviate from the originally predetermined range of values. As a result, there is greater measurement error caused by the fiber optic interferometer, greatly limiting the operating distance measurable by the fiber optic interferometer. In this light, the present invention provides a method for tracing changes in biases $e_A$ and $e_B$ of the interference signals $I_A$ and $I_B$ respectively so as to correct the two interference signals having the aforesaid values decreased respectively as the gap is increased and prevent the values of the two interference signals $I_A$ and $I_B$ from being affected by the gap d.

Figure 6A:
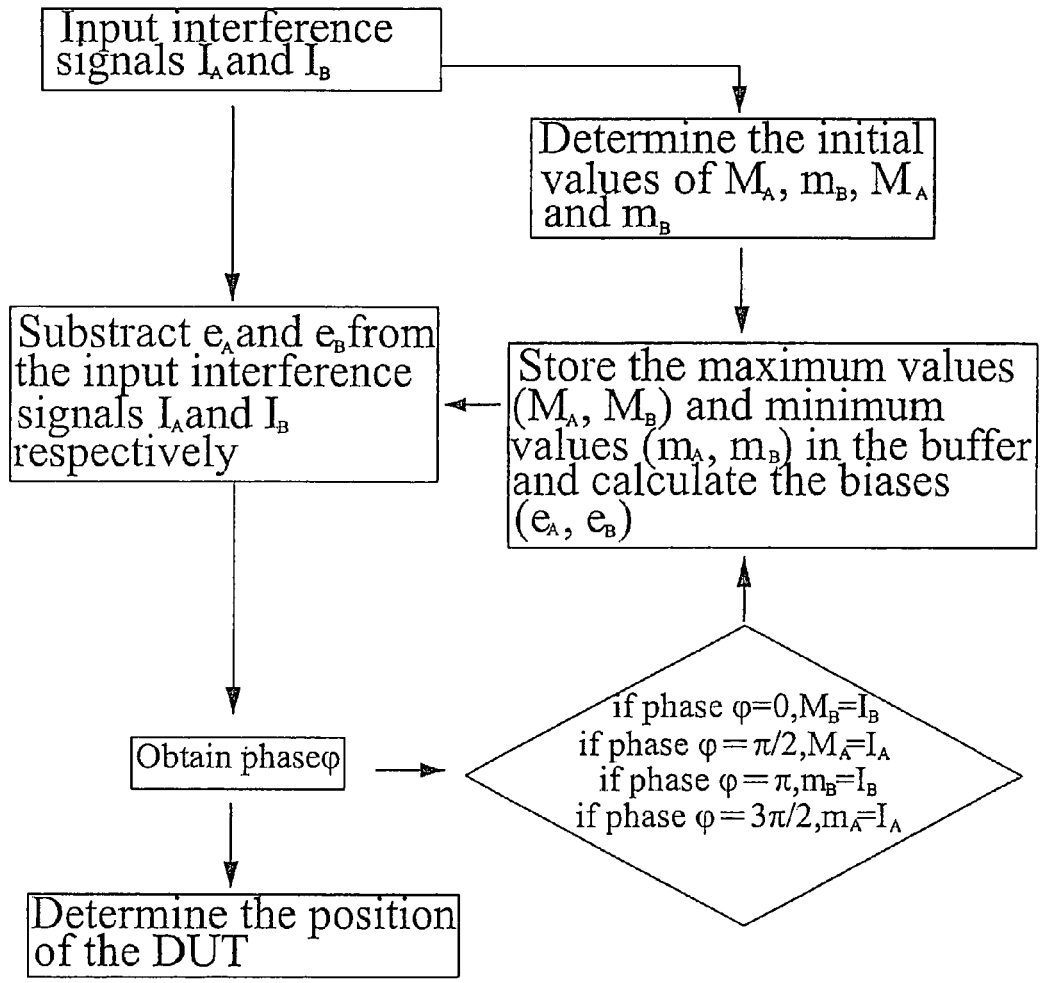
FIG. 6a is a flowchart illustrating correction of a pattern of the interference signals as shown in FIG. 5 by a bias correction method.
Figure 6B:
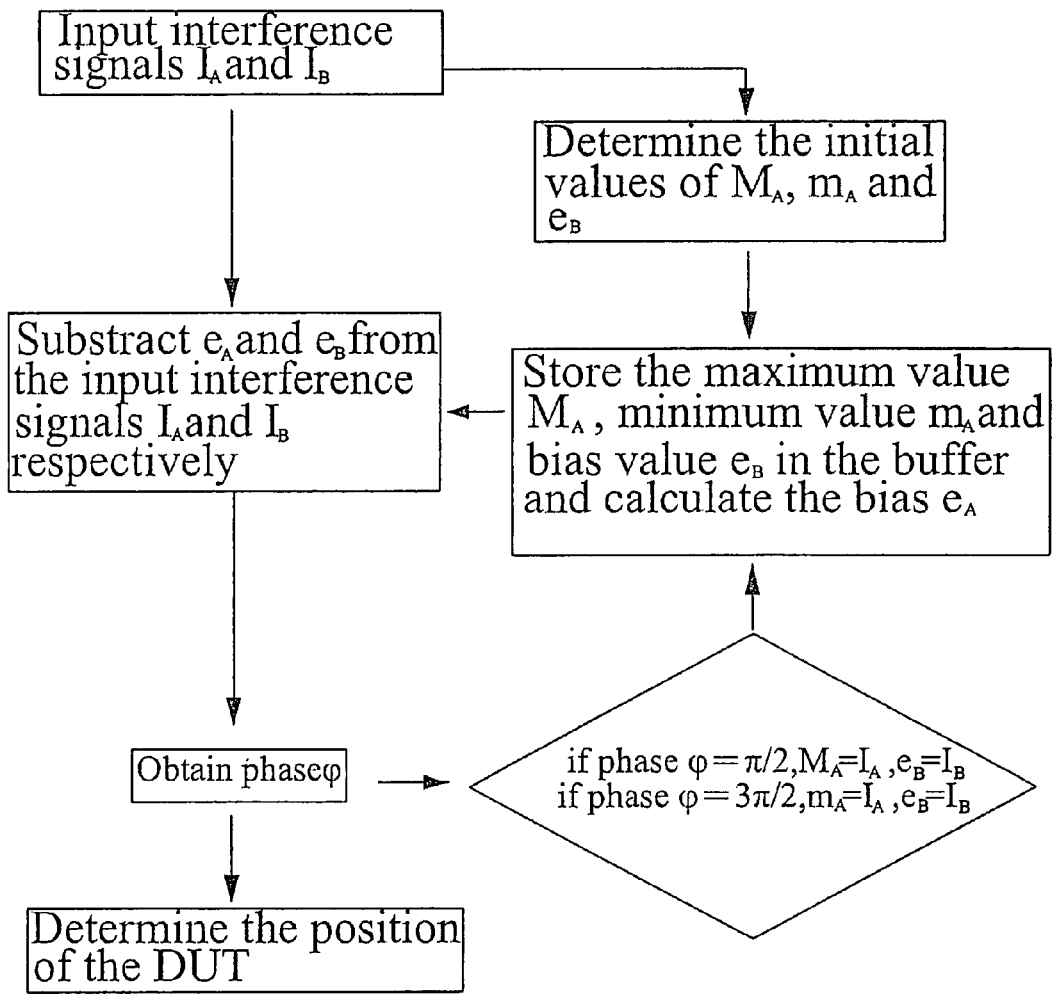
FIG. 6b is a flowchart illustrating correction of a pattern of the interference signals as shown in FIG. 5 by another bias correction method.
Figure 6C:
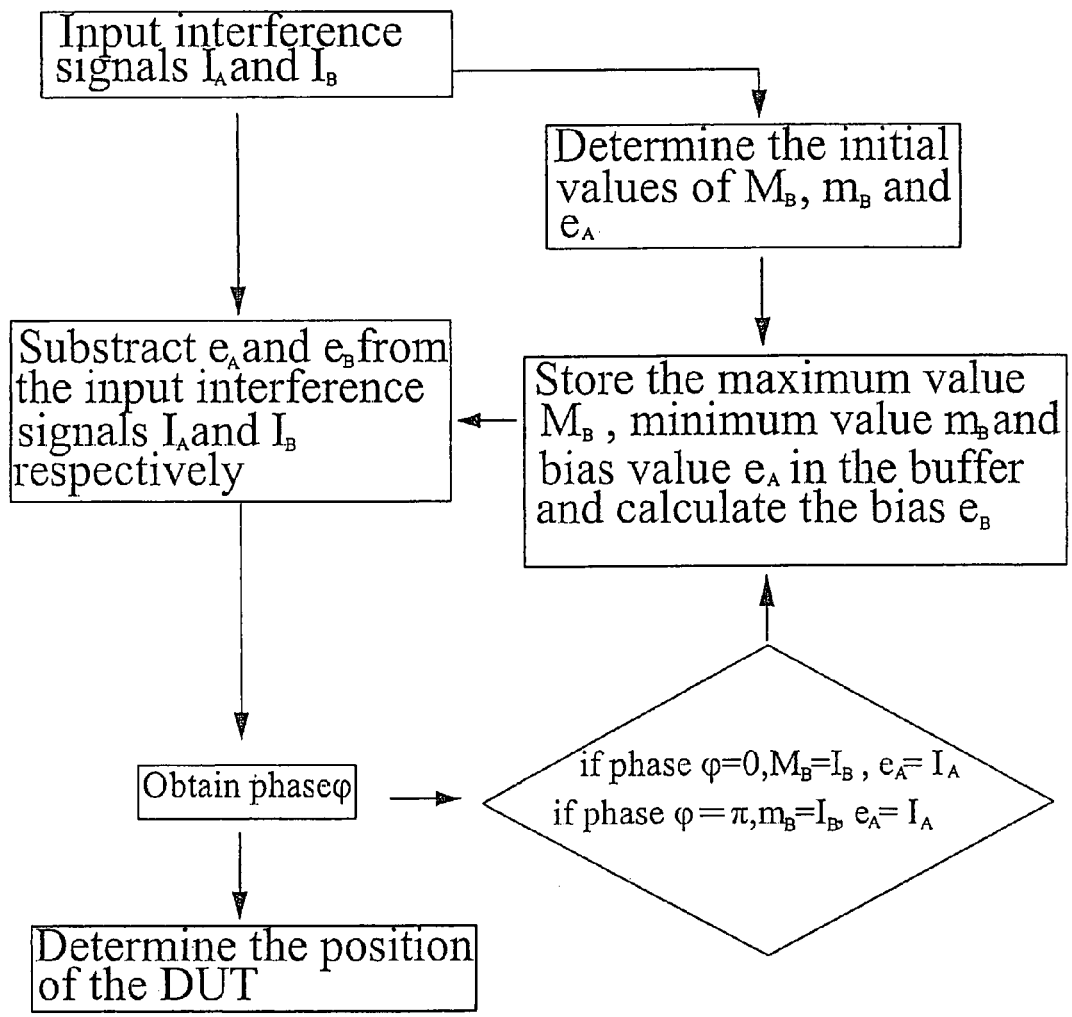
FIG. 6c is a flowchart illustrating correction of a pattern of the interference signals as shown in FIG. 5 by a further bias correction method.
Figure 7:
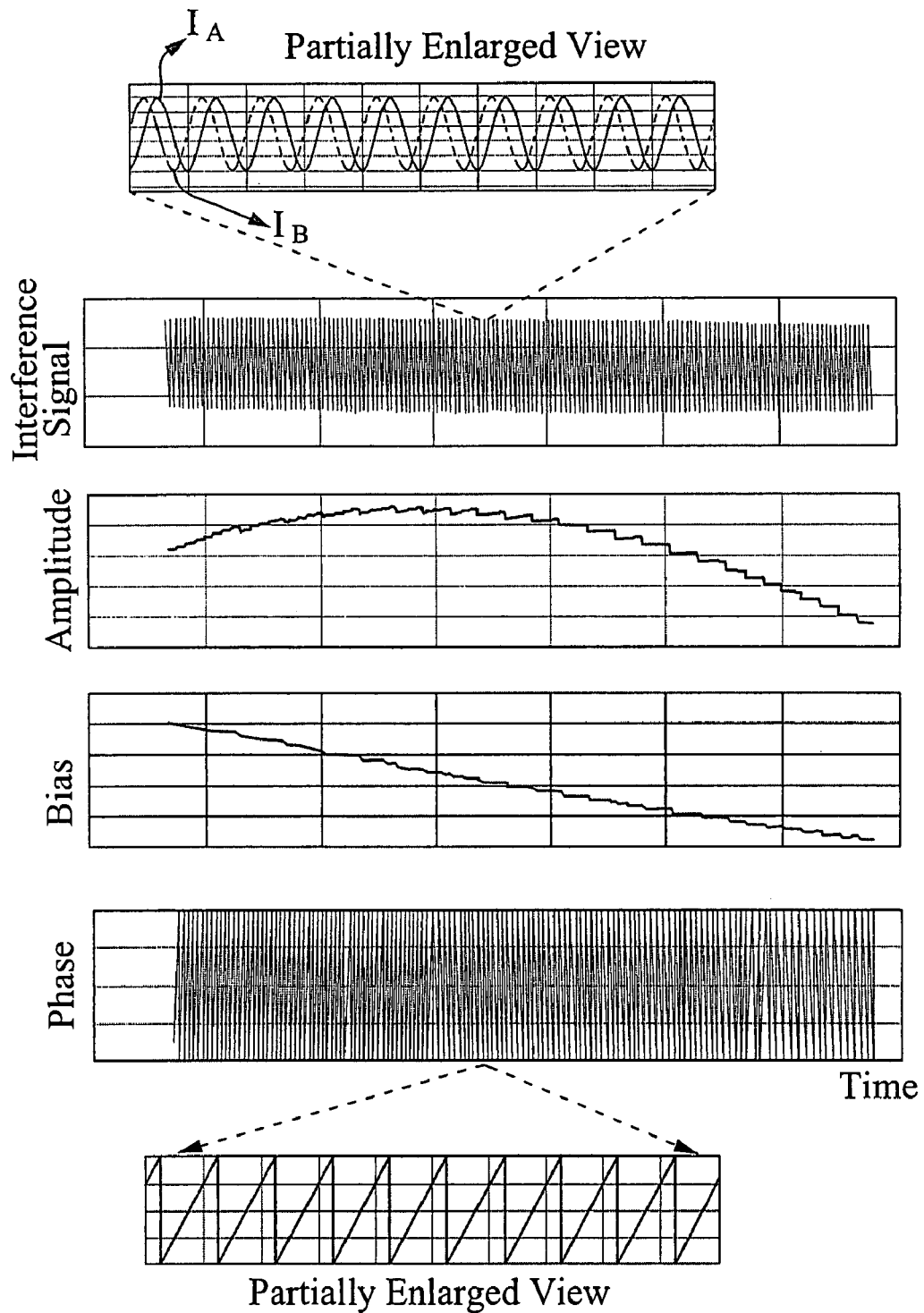
FIG. 7 shows schematic diagrams illustrating corrections of interference signals $I_A$ and $I_B$ by a bias correction methods as shown in either of FIGS. 6a through 6c and the phases so obtained.

The bias correction method is operated in three different manners as shown in FIGS. 6a to 6c respectively. In a real operation, one of the bias correction methods is selected for use. FIG. 7 is a schematic diagram illustrating the phase $\phi$ obtained by correcting the values of the two interference signals $I_A$ and $I_B$ in accordance with a flowchart of a bias correction method as shown in FIG. 6a, FIG. 6b or FIG. 6c.

As shown in FIG. 6a, a flowchart of a bias correction method according to the present invention is described as follows.

The interference signals $I_A$ and $I_B$ initially have maximum values ($M_A$ and $M_B$) and minimum values ($m_A$ and $m_B$), all of which respectively input a buffer (not shown). When the measurement object moves to cause a displacement, the interference signals $I_A$ and $I_B$ having different maximum values ($M_A$ and $M_B$) and minimum values ($m_A$ and $m_B$) continue to input the buffer. The buffer stores only the maximum values ($M_A$ and $M_B$) and minimum values ($m_A$ and $m_B$) of the most recent interference signals $I_A$ and $I_B$, and also, it continues to compute the approximate biases $e_A$ and $e_B$ of the interference signals $I_A$ and $I_B$ at this moment in accordance with the following equation:

$$e_j = (M_j + m_j)/2 \quad \text{(Equation 12)}$$

where j=A or B

Then, the interference signals $I_A$ and $I_B$ as expressed in Equations (9) and (10) are modified by Equation (12) to become:

$$I_A - e_A = 2\gamma_A(1-R_1)I_0\sqrt{R_1 R_2 T}\cos(4\pi d_A/\lambda) \quad \text{(Equation 13)}$$

$$I_B - e_B = 2\gamma_B(1-R_1)I_0\sqrt{R_1 R_2 T}\cos(4\pi d_B/\lambda) \quad \text{(Equation 14)}$$

Thus, the aforesaid Equations (5) and (8) are also modified to become:

$$\frac{I_A - e_A}{I_B - e_B} = \tan(4\pi d_B/\lambda) \quad \text{(Equation 15)}$$

$$\frac{4\pi d_B}{\lambda} = \tan^{-1}\left(\frac{I_A - e_A}{I_B - e_B}\right) + 2m\pi \quad (m \text{ is an integral}) \quad \text{(Equation 16)}$$

Subsequently, the phase of a point in a wave period of the interference signals can be easily obtained by an electronic interpolation technique, and also, the position (displacement) of the measurement object indicative of the phase can be easily obtained by computation.

If the phase value $\phi$ is just $\pi/2$ after the computation, the aforesaid maximum value $M_A$ of the interference signal $I_A$ stored in the buffer will be replaced with the value of the interference signal $I_A$. If the phase value $\phi$ is just $3\pi/2$ after the computation, the aforesaid minimum values $m_A$ of the interference signal $I_A$ stored in the buffer will be replaced with the value of the interference signal $I_A$. If the phase value $\phi$ is just 0 after the computation, the aforesaid maximum value $M_B$ of the interference signal $I_B$ stored in the buffer will be replaced with the value of the interference signal $I_B$. Similarly, if the phase value $\phi$ is just $\pi$ after the computation, the aforesaid minimum value $m_B$ of the interference signal $I_B$ stored in the buffer will be replaced with the value of the interference signal $I_B$.

As stated above, except the bias correction method as shown in FIG. 6a, either of the other two bias correction methods which will be described now can be used to correct the two interference signals $I_A$ and $I_B$ so as to obtain the value of the phase $\phi$.

Referring to FIG. 6b, a flowchart of another bias correction method according to the present invention is illustrated. The maximum value ($M_A$) and the minimum value ($m_A$) of the interference signal $I_A$ at the beginning and the bias $e_B$ of the interference signal $I_B$ at this moment respectively input a buffer (not shown). When the measurement object moves to cause a displacement, the interference signal $I_A$ having different maximum value ($M_A$) and minimum value ($m_A$) continues to input the buffer. The buffer stores only the maximum value ($M_A$) and minimum value ($m_A$) of the most recent interference signals $I_A$, and also, it continues to compute the approximate bias $e_A$ of the interference signal $I_A$ at this moment in accordance with Equation (12). Subsequently, the phase of a point in a wave period of the interference signal can be easily obtained by Equations (13) through (16) and the electronic interpolation technique.

If the phase value $\phi$ is just $\pi/2$ after the computation, the aforesaid maximum value $M_A$ of the interference signal $I_A$ stored in the buffer will be replaced with the value of the interference signal $I_A$, and also, the aforesaid value of the bias $e_B$ stored in the buffer will be replaced with the value of the interference signal $I_B$. If the phase value $\phi$ is just $3\pi/2$ after the computation, the aforesaid minimum value $m_A$ of the interference signal $I_A$ stored in the buffer will be replaced with the value of the interference signal $I_A$, and also, the aforesaid value of the bias $e_B$ stored in the buffer will be replaced with the value of the interference signal $I_B$.

Referring to FIG. 6c, a flowchart of a further bias correction method according to the present invention is illustrated. The maximum value ($M_B$) and the minimum value ($m_B$) of the interference signal $I_A$ at the beginning and the bias $e_A$ of the interference signal $I_A$ at this moment respectively input a buffer (not shown). When the measurement object moves to cause a displacement, the interference signal $I_B$ having a different maximum value ($M_B$) and minimum value ($m_B$) continues to input the buffer. The buffer stores only the maximum value ($M_B$) and minimum value ($m_B$) of the most recent interference signals $I_B$, and also, it continues to compute the approximate bias $e_B$ of the interference signal $I_B$ at this moment in accordance with Equation (12). Subsequently, the phase of a point in a wave period of the interference signal can be easily obtained by Equations (13) through (16) and the electronic interpolation technique.

If the phase value $\phi$ is just 0 after the computation, the aforesaid maximum value $M_B$ of the interference signal $I_B$ stored in the buffer will be replaced with the value of the interference signal $I_B$, and also, the aforesaid value of the bias $e_A$ stored in the buffer will be replaced with the value of the interference signal $I_A$. If the phase value $\phi$ is just $\pi$ after the computation, the aforesaid minimum value $m_B$ of the interference signal $I_B$ stored in the buffer will be replaced with the value of the interference signal $I_B$, and also, the aforesaid value of the bias $e_A$ stored in the buffer will be replaced with the value of the interference signal $I_A$.

Thus, the measurable scope of the fiber optic interferometric position sensor of the present invention is significantly broadened by any of the aforesaid bias correction methods, overcoming the limitation to the measurable distance of the conventional fiber optic interferometers.

As stated above, the fiber optic interferometric position sensor of the present invention is capable of obtaining the phase of a point in a wave period of interference signals by the electronic interpolation technique as well as the position (displacement) of the measurement object indicative of the phase by corresponding computation. In this connection, the fiber optic interferometric position sensor of the present invention has a resolution of less than one-half wavelength of the light source, overcoming the limitation to the resolution of the conventional fiber optic interferometers. The operation of the electronic interpolation technique now will be described.

Figure 8:
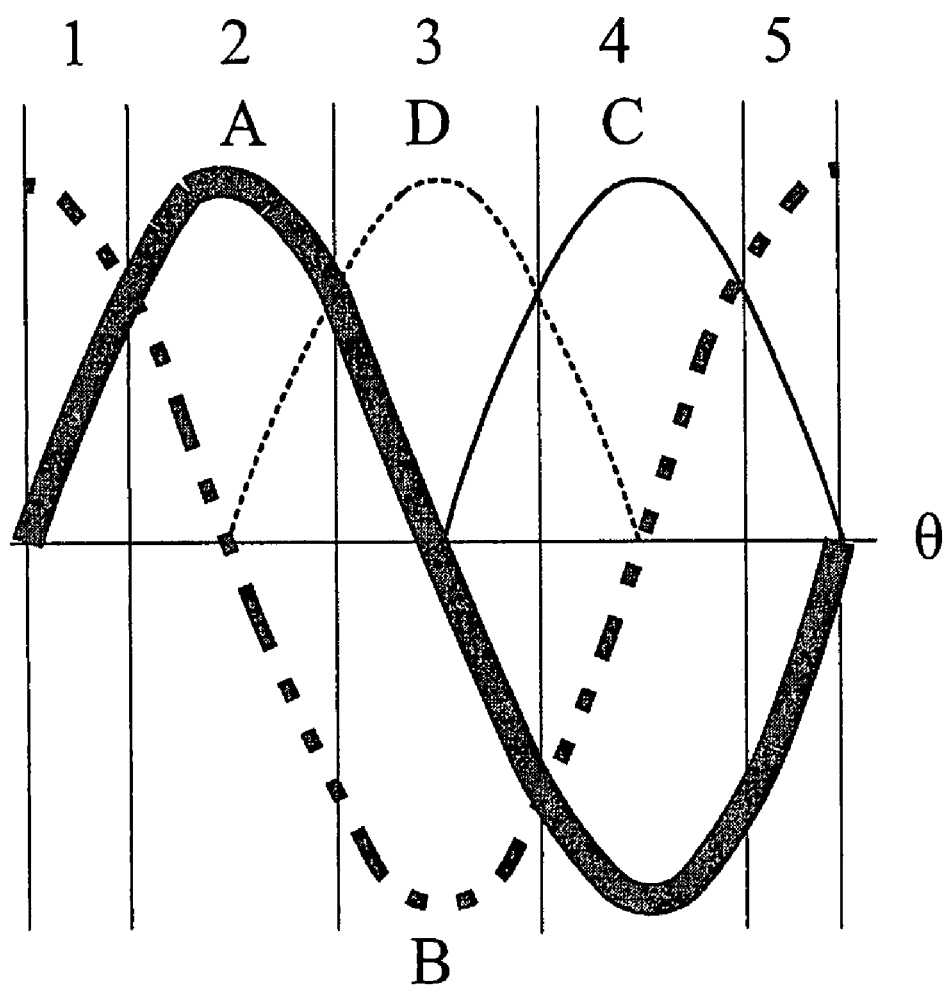
FIG. 8 is a schematic diagram illustrating the phase of a point in a wave period of interference signals by an electronic interpolation technique.

First, provided $$A = \frac{I_P}{S} = \sin(\theta), \quad B = \frac{I_Q}{Q} = \cos(\theta), \quad C = |A|$$

and D=|B|, where both $\tan^{-1}(A/B)$ and $\tan^{-1}(B/A)$ are taken between $-\pi/2$ and $\pi/2$ while $\theta$ is between 0 and $2\pi$; and then, the phase $\theta$ of a point in a wave period of the interference signals as shown in FIG. 8 is computed by phase computation rule depicted in a table below, the table being divided into several regions (region 1 to region 5) selected in accordance with the conditions of determination as specified in the respective divided regions.

TABLE 1

| Region No. | Conditions of determination | Phase computation rule |
| --- | --- | --- |
| 1 | A >= 0 and B > 0 and C <= D | $\tan^{-1}(A/B)$ |
| 2 | A > 0 and C >= D | $\pi/2 - \tan^{-1}(B/A)$ |
| 3 | B < 0 and C <= D | $\pi + \tan^{-1}(A/B)$ |
| 4 | A < 0 and C >= D | $3\pi/2 - \tan^{-1}(B/A)$ |
| 5 | A <= 0 and B > 0 and C <= D | $2\pi + \tan^{-1}(A/B)$ |

The arc tangent calculation as involved in the aforesaid phase computation can be promptly determined by referring to a look-up table. Hence, the fiber optic interferometric position sensor of the present invention is capable of rapidly obtaining the displacement of a measurement object in association with this electronic interpolation technique, the displacement being less than one-half wavelength of the light source.

Figure 9A:
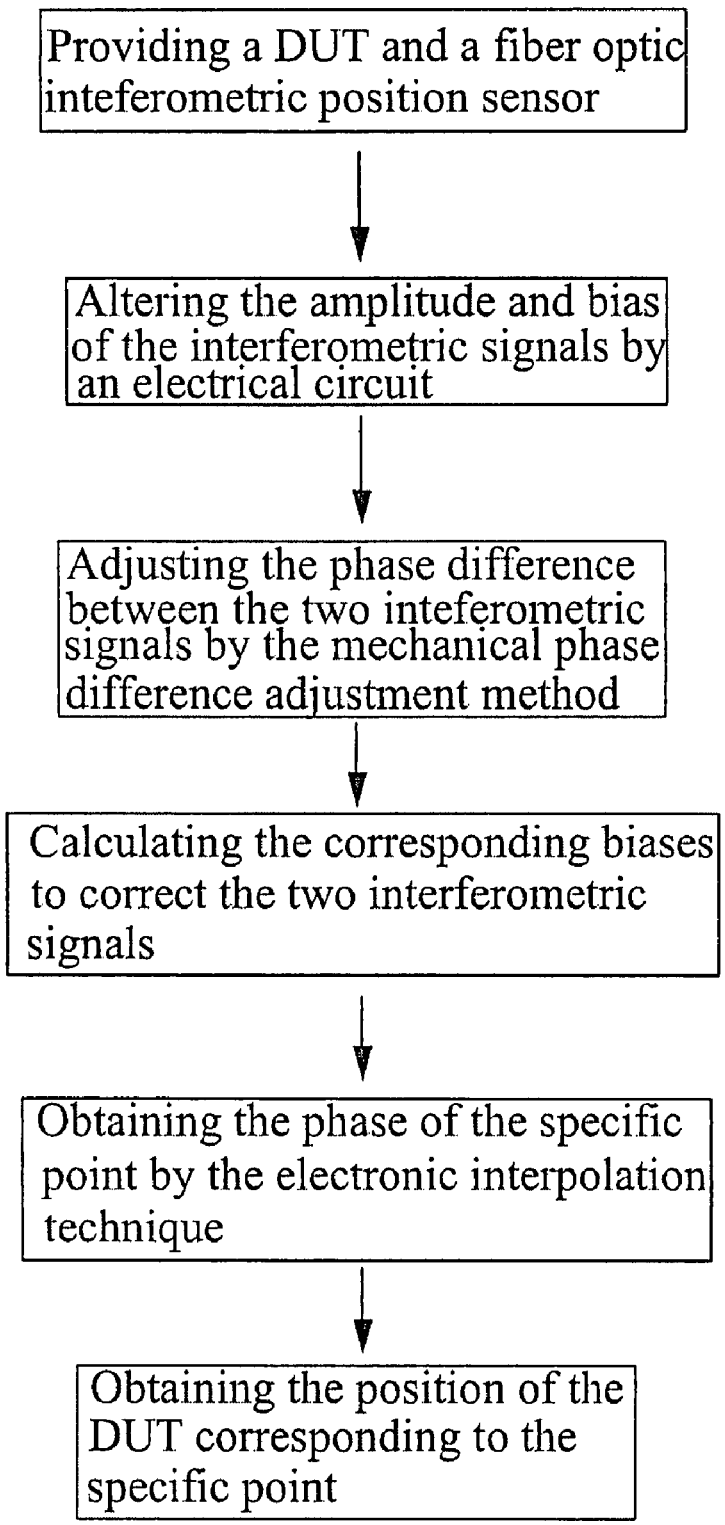
FIG. 9a is a flowchart illustrating measurement of the displacement and the position of a measurement object by a mechanical phase difference adjustment method with a fiber optic interferometric position sensor according to the present invention.
Figure 9B:
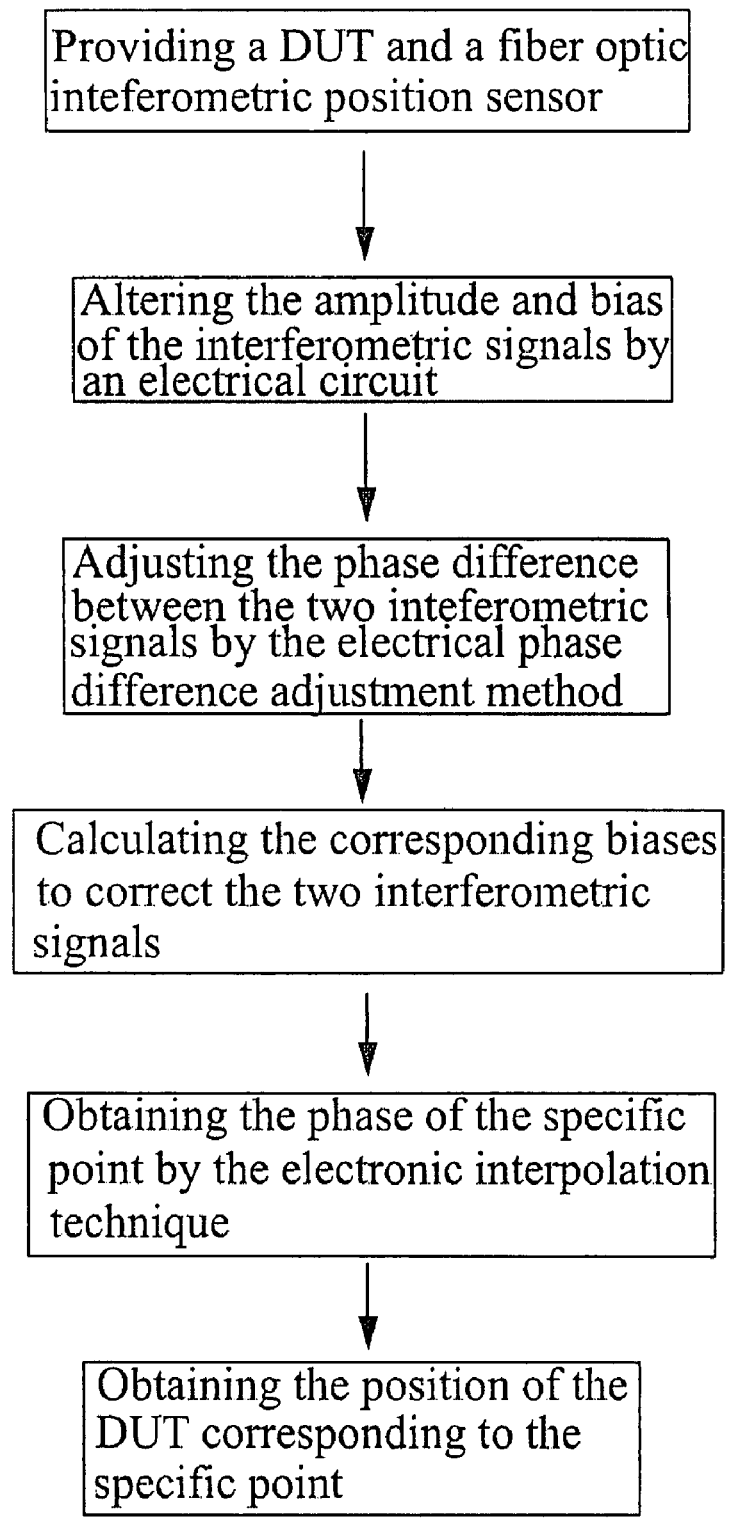
FIG. 9b is a flowchart illustrating measurement of the displacement and the position of a measurement object by an electronic phase difference adjustment method with a fiber optic interferometric position sensor according to the present invention.

FIGS. 9a and 9b are flowcharts illustrating the displacement and the position of a measurement object by means of a fiber optic interferometric position sensor according to the present invention. In FIG. 9a, an optical path length difference between two interference signals of a fiber optic interferometric position sensor according to the present invention is altered by a mechanical phase difference adjustment method prior to a measurement, and a 90-degree phase difference between two initial interference signals $I_A$ and $I_B$ is generated. In FIG. 9b, two initial interference signals both of which do not have a 90-degree phase difference are altered to form two initial interference signals $I_A$ and $I_B$ both of which have a 90-degree phase difference after calculation with a circuit by an electrical phase adjustment method prior to a measurement.

After the phase difference of the two initial interference signals is altered, the phase of a point in a wave period of the interference signals is obtained by any of the aforesaid bias correction methods and the electronic interpolation technique. As a result, the position (displacement) of the measurement object corresponding to the phase is obtained by computation.

As described above, when the fiber optic interferometric position sensor of the present invention is used to measure the position of the measurement object, the two initial interference signals $I_A$ and $I_B$ ($I_A'$ and $I_B'$) which have a 90-degree phase difference need to be obtained first by the aforesaid mechanical phase difference adjustment method or the aforesaid electrical phase difference adjustment method or both the methods. Then, the position of the measurement object is rapidly obtained by the phase as a result of the aforesaid phase computation method.

Figure 10:
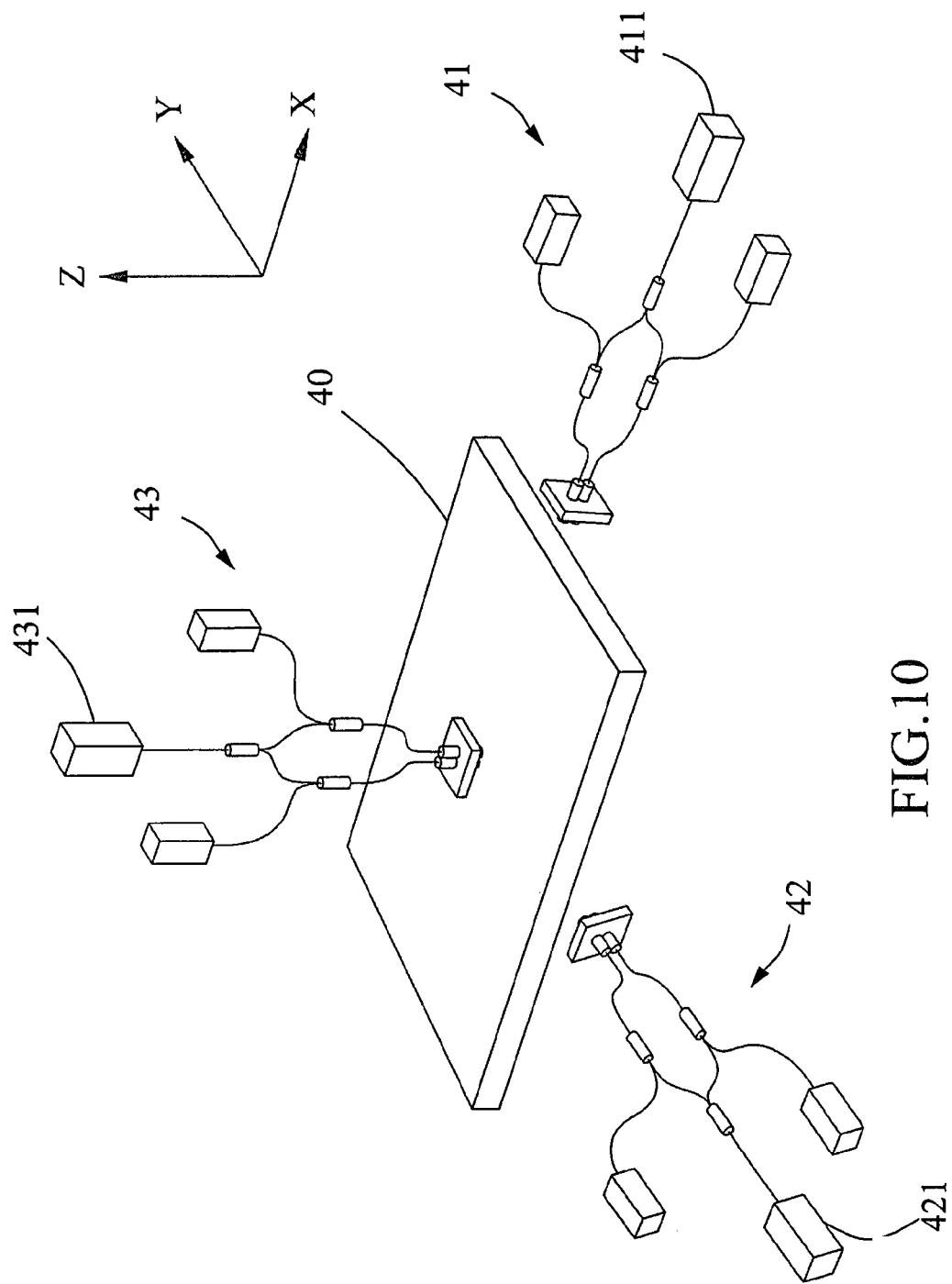
FIG. 10 is a schematic diagram illustrating an application of position sensing devices of fiber optic interferometric position sensors according to the present invention to measure changes in the position of a measurement object with respect to the three-axes (X, Y and Z).

FIG. 10 is a schematic diagram illustrating changes in the position of a measurement object in three-axial directions (X-Y-Z) measured by position sensing devices of fiber optic interferometric position sensors of the present invention, in which a first fiber optic interferometric position sensor 41 measures a change in the position of a measurement object 40 in the X-axis direction, a second fiber optic interferometric position sensor 42 measures a change in the position of the measurement object 40 in the Y-axis direction, and a third fiber optic interferometric position sensor 43 measures a change in the position of the measurement object 40 in the Z-axis direction. Then, interference signals of the aforesaid fiber optic interferometric position sensors are altered by the aforesaid mechanical phase difference adjustment method or the aforesaid electrical phase difference adjustment method or both the methods to result in a 90-degree phase difference between two of the interference signals prior to the measurement. In the measurement, data respectively obtained from the first fiber optic interferometric position sensor 41, the second fiber optic interferometric position sensor 42 and the third fiber optic interferometric position sensor 43 are integrated so that data about changes in the position of the measurement object 40 in the three-axial directions (X-Y-Z) can be easily obtained by employing the position sensing devices of the fiber optic interferometric position sensors of the present invention. It must be noted that though the first fiber optic interferometric position sensor 41, the second fiber optic interferometric position sensor 42 and the third fiber optic interferometric position sensor 43 have light sources 411, 421 and 431, respectively, as shown in FIG. 10, the position sensing devices of the fiber optic interferometric position sensors of the present invention can adopt a single light source (not shown). In this connection, the laser beam is simultaneously transmitted to the aforesaid first fiber optic interferometric position sensor 41, the second fiber optic interferometric position sensor 42 and the third fiber optic interferometric position sensor 43 through a fiber optic coupler (not shown) to measure changes in the position of the measurement object 40 in the three-axial directions (X-Y-Z).

Figure 11:
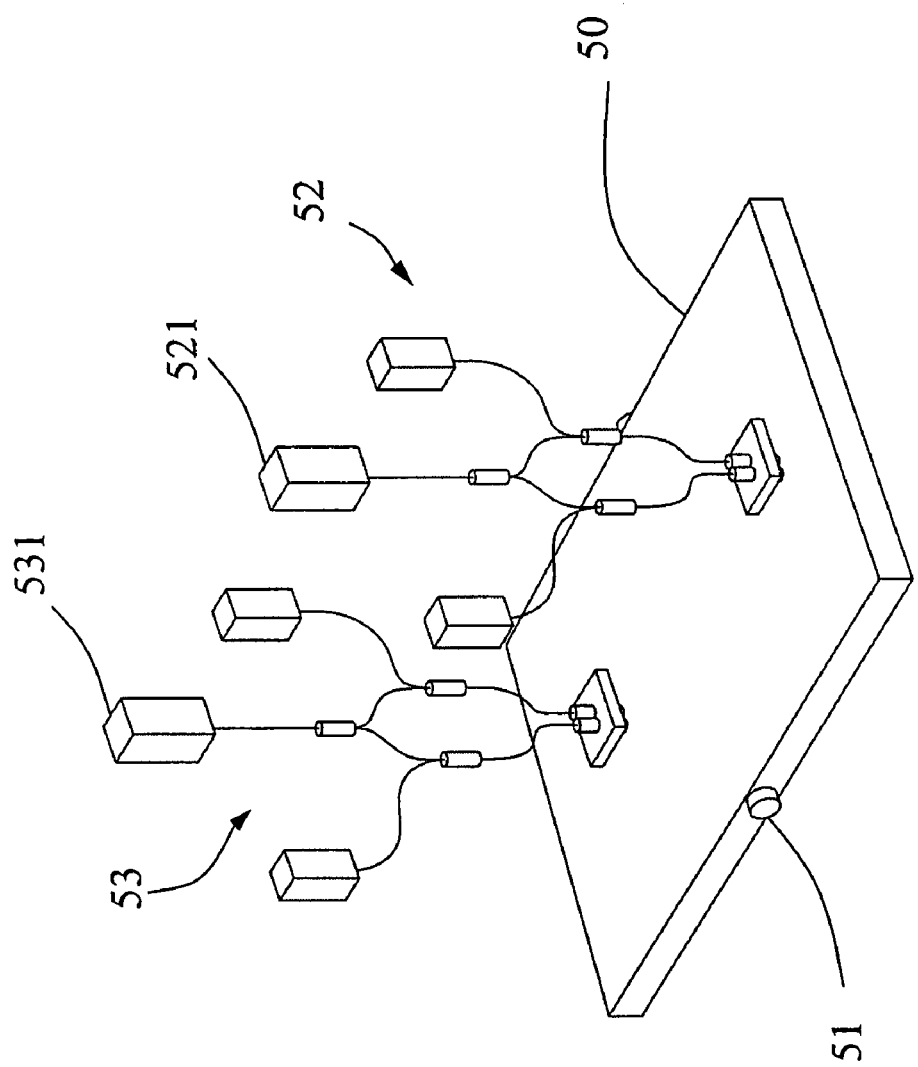
FIG. 11 is a schematic diagram illustrating an application of position sensing devices of fiber optic interferometric position sensors according to the present invention to measure changes in the position of a measurement object as a result of rotation of the measurement object.

FIG. 11 is a schematic diagram illustrating changes in the position of a measurement object measured by position sensing devices of fiber optic interferometric position sensors of the present invention as a result of rotation of the measurement object, in which a measurement object 50 rotates about an axis 51 on both sides of which a first fiber optic interferometric position sensor 52 and a second fiber optic interferometric position sensor 53 are mounted respectively. Then, interference signals of the aforesaid firer optic interferometric position sensors are altered by the aforesaid mechanical phase difference adjustment method or the aforesaid electrical phase difference adjustment method or both the methods to result in a 90-degree phase difference between the interference signals prior to the measurement. In the measurement, data respectively obtained from the first fiber optic interferometric position sensor 52 and the second fiber optic interferometric position sensor 53 are integrated so that related data such as rotation angle or mode about changes in the position of the measurement object 50 rotating about the axis 51 can be easily obtained by employing the position sensing devices of the fiber optic interferometric position sensors of the present invention. It must be noted that though the first fiber optic interferometric position sensor 52 and the second fiber optic interferometric position sensor 53 have light sources 521 and 531, respectively, as shown in FIG. 11, the position sensing devices of the fiber optic interferometric position sensors of the present invention can adopt a single light source (not shown). In this connection, the laser beam is simultaneously transmitted to the aforesaid first fiber optic interferometric position sensor 52 and the second fiber optic interferometric position sensor 53 through a fiber optic coupler (not shown) to measure changes in the position of the measurement object 50 as a result of the rotation of the measurement object 50.

The aforesaid embodiments are illustrative for description of the present invention without any limitation. Therefore, the present invention should be construed as limited only by the appended claims.

What is claimed is:

1. A fiber optic interferometric position sensor suited to measure the position of a measurement object, comprising:
    at least one light source for providing an optical signal;
    a plurality of fiber optic couplers, respectively connected to said at least one light source;
    a plurality of sensing fibers connected to said fiber optic couplers, respectively, each having a termination adjacent to said measurement object; and
    a plurality of photodetectors connected to said fiber optic couplers, respectively;
    wherein said optical signal is separated into a plurality of optical sub-signals to be respectively transmitted into the sensing fibers via said fiber optic couplers; part of said optical sub-signals pass through said terminations of said sensing fibers and are incident on the surface of said measurement object, respectively, being reflected back into said sensing fibers from said surface to form a plurality of measurement signals; another part of said optical sub-signals are reflected back into said sensing fibers from said terminations of said sensing fibers, respectively, to form a plurality of reference optical signals; said reference optical signals and said measurement signals interfere, resulting in a plurality of interference signals; and said interference signals travel to said photodetectors via said fiber optic couplers, respectively, and then, are detected and recorded by means of said photodetectors, respectively;
    said fiber optic interferometric position sensor providing a means to measure the position of the measurement object by carrying out the following steps:
    obtaining a first initial signal and a second initial signal from the position of said measurement object measured by said fiber optic interferometric position sensor;

adjusting the phase difference between said first initial signal and said second initial signal so as to alter said first initial signal and said second initial signal to form a third initial signal and a fourth initial signal which have a 90-degree phase difference;

moving said measurement object to change the position of said measurement object so that said fiber optic interferometric position sensor outputs a first measurement signal and a second measurement signal corresponding to the position of said measurement object;

computing the values of biases of said first measurement signal and said second measurement signal, respectively, both of which being corrected by a bias correction method to obtain a third measurement signal and a fourth measurement signal;

obtaining the phase value corresponding to the position of said measurement object from said third measurement signal and said fourth measurement signal after calculation by an interpolation technique; and obtaining the position of said measurement object after computation by using said phase value.

2. The position sensor of claim 1, wherein said at least one light source is a laser light source.

3. The position sensor of claim 2, wherein said position sensor further comprises a light-source fiber optic coupler connected to said laser light source and said fiber optic couplers.

4. The position sensor of claim 1, wherein said position sensor further comprises a holding device for holding said sensing fibers to space apart at a predetermined distance.

5. The position sensor of claim 4, wherein said position sensor further comprises a micro-adjuster for tilting said holding device at a predetermined angle.

6. The position sensor of claim 4, wherein said holding device is an MT fiber optic array connector.

7. The position sensor of claim 1, wherein said fiber optic couplers are sintered fiber optic couplers.

8. The position sensor of claim 1, wherein said sensing fibers are single-mode fibers.

9. The position sensor of claim 1, wherein said photodetectors are two charge-couple device detectors.

* * * * *